Aug. 9, 1932.   B. A. PROCTOR   1,871,234
CONTAINER FOR FILMS AND MEANS FOR HANDLING THE SAME
Filed Jan. 16, 1929
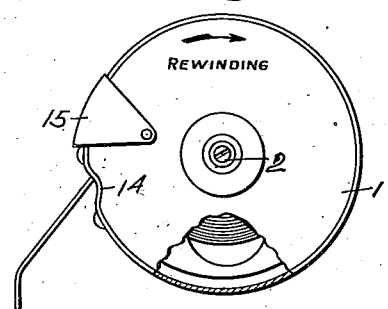
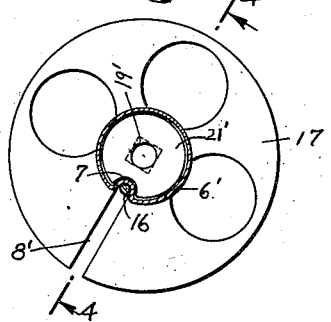
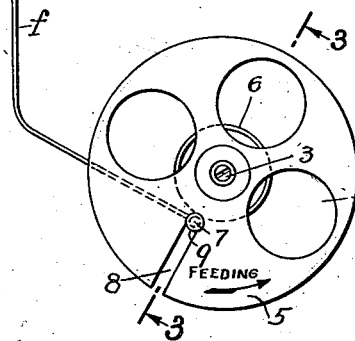
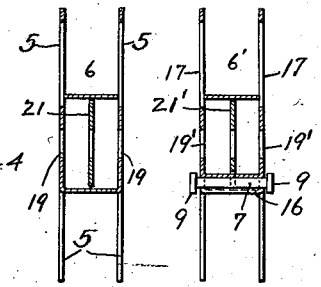
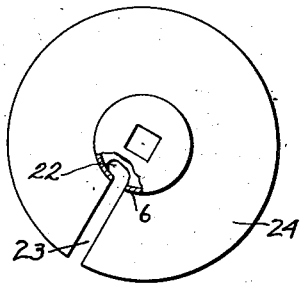
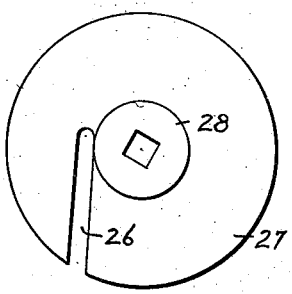
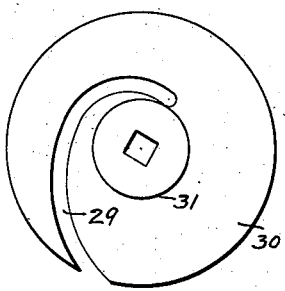
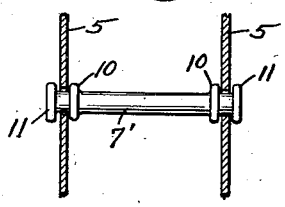
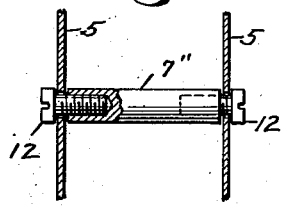
INVENTOR.
BARTON ALLEN PROCTOR
BY
ATTORNEYS.

Patented Aug. 9, 1932

1,871,234

UNITED STATES PATENT OFFICE

BARTON ALLEN PROCTOR, OF PELHAM MANOR, NEW YORK, ASSIGNOR, BY MESNE ASSIGNMENTS, TO KINATOME PATENTS CORPORATION, OF NEW YORK, N. Y., A CORPORATION OF NEW YORK,

CONTAINER FOR FILMS AND MEANS FOR HANDLING THE SAME

Application filed January 16, 1929. Serial No. 332,881.

My invention can be applied to any art in which material is fed from or to a carrier or support, and is particularly useful in connection with carriers or supports for films whether for light-sensitive material adapted for use in a camera or sound recording apparatus, or for image bearing material adapted for use in a motion picture or stereopticon projector or with a sound reproducing instrument or with an apparatus adapted for the simultaneous reproduction of visual images and sound.

The present application is a continuation in part of my co-pending application Serial Number 54,910, filed September 8, 1925.

In my apparatus such as that shown and claimed in the above mentioned application I provide means for automatically placing the film in full operative relation with the film handling instrument and if desired for rewinding it after the projection or exposure cycle, without its removal from the instrument. When I use a film of relatively short length, I may employ a double magazine of a type heretofore disclosed and known in the art comprising two holders connected together either rigidly or by means of a hinge. I have found, however, a double magazine of either such type when of sufficient size to accommodate films of relatively great length to be somewhat bulky, and hence difficult to handle and difficult and expensive to ship and store. An object of the present invention is to provide a single magazine, of a total bulk and weight materially less than that of any double magazine of the same film capacity and much more convenient to handle, which, when placed upon the delivery or rewinding spindle of the instrument will serve equally well or better to facilitate the positioning of the film for use in the instrument and, when detached therefrom, will serve equally well or better to protect the film during shipment and storage. The present invention discloses means co-operating with such a magazine whereby the film therein may be quickly attached to a take-up reel or support and, during the projecting, reproducing or exposure cycle will be firmly held in place relatively thereto and wound thereupon and, substantially at the conclusion of the rewinding cycle, automatically detached therefrom.

Still further objects of my invention are the provision of means to prevent the disappearance of the end of the film within the magazine after it has been rewound thereinto and to protect the film when therein.

Still further objects of my invention include the provision of cheaply constructed, and easily handled detachable film magazines of a bulk, weight and size only slightly greater than that of the film therein, of a take-up or receiving reel, of which only one need be provided for each instrument, with which the film which is supported and protected by the magazine may be instantly put into operative relation and from which it will be automatically detached at the conclusion of rewinding; and of inexpensive and simple connective means between the film and the take-up reel such that it efficiently co-operates with both the take-up reel and the magazine.

Other objects and characteristics are apparent from the following description, the attached drawings and the subjoined claims. Although I am showing one preferred embodiment of my invention, it will be readily understood that I am not limited to this particular construction as changes can readily be made without departing from the spirit of my invention or the scope of my broader claims.

Figure 1 is a side elevational view showing the single container, the receiving reel, and one preferred method of attaching the film thereto.

Figure 2 is a side elevational view of one preferred form of receiving reel with a substantially radial slot which terminates in a recess within the hub.

Figure 3 is a section upon the line III—III of Figure 1.

Figure 4 is a section upon the line IV—IV of Figure 2 showing the pin in position.

Figure 5 is a side elevational view of another preferred form of receiving reel having substantially radial slot with an extension lateral thereto.

Figure 6 is a side elevational view of a film receiving reel having a slot tangential to the hub.

Figure 7 is a side elevational view of a reel showing a curved slot.

Figures 8 and 9 show preferred construction of the connecting pin.

In carrying out my invention, I may provide a film magazine 1 adapted to be removably mounted over the end of a supply or delivery spindle 2 of a film handling instrument such as, for example, that described and claimed in my co-pending application Serial Number 54,910 referred to. The film $f$ may be wound upon a reel or other appropriate support, not shown in full contained within the magazine 1, the inner or so-called trailer end of the film being permanently attached to such support, preferably by a length of heat resisting material as disclosed in the above mentioned application and in application Serial Number 332,880, filed concurrently herewith. During the projection cycle the spindle 2 may idle, being turned in an anti-clockwise direction as viewed in Figure 1 of the drawings, as the film is fed. During the rewinding cycle, power may be applied to this spindle to turn the same in a clockwise direction as viewed in Figure 1 of the drawings, whereby the film is rewound upon the inner reel or other appropriate structure contained within the magazine 1.

Upon the take-up or driving spindle 3 of the film handling apparatus, I may mount the receiving reel 4. Such reel may be of any suitable construction, such as that of two sideplates 5 supported in spaced parallelism by a hub 6. I may permanently attach this reel to the take-up spindle, or I may construct it so that it can be removably mounted over the end of the spindle. In the latter case, it will be understood that the apparatus will be adapted, when the magazine 1 and the reel 4 are demounted therefrom, to the use of any common reel upon which film may be wound by a dealer in films, or by one of the so-called film-libraries or film exchanges. In either case, it will be necessary to furnish but one such take-up reel for each apparatus. When double magazines are used it is necessary to provide a take-up container and take-up reel for each film in service. Since there are relatively many more films than instruments in service, it will be understood that this item of my invention results in considerable economy.

During the feeding cycle, the spindle 3 is revolved in an anti-clockwise direction as viewed in Figure 1 of the drawings, thus similarly revolving the reel 4 and winding the film $f$ thereupon. When the film is rewound by the application of power to the rewinding spindle 2, the reel 4 is revolved in a clockwise direction and the spindle 3 idles. Power may be applied to such spindles in any suitable manner, as in the manner shown in my co-pending application Serial Number 54,910.

In order suitably to attach the film to such take-up reel, I may provide the outer or leader end of the film $f$ with a pin 7 permanently attached thereto adapted to engage in substantially opposite slots 8 in each of the side plates 5 of the reel 4.

The pin 7 may be merely a piece of drill rod or other round stock turned down in the center so as to provide heads 9 to prevent its movement laterally relative to the side plates of the reel with which it is used. I have found, however, that if such sides are made of thin sheet metal, as may be desirable under certain conditions, and for other reasons, it may be preferable as is clearly shown in Figure 8 of the drawings, to provide each end of the pin 7' with a double head composed of two flat extensions 10 and 11 at right angles to the axis of the pin, positioned one upon each side of the side plates 5 of the reel. Thus the pin is guided relatively to each side of each side plate of the reel, and the possibility of the pin jamming in the slot or being pulled laterally therethrough as it is drawn either inwardly or outwardly relative to the axis of the reel is minimized. Under certain conditions it may be desirable to provide a pin 7'' with removable heads. Under such circumstances, as is clearly shown in Figure 9 of the drawings, I merely insert headed screws 12 into the pin 7''.

It will be readily understood that such a construction enables the user quickly to secure the end of the film in the receiving reel 4 by merely slipping the pin into the slot 8. During the feeding cycle, as the reel 4 is revolved in an anti-clockwise direction as viewed in the drawings, the pin is drawn to the inner end of the slot and in effect sealed therein as the reel continues to revolve and the film is wrapped about the hub 6 and over the pin.

At the conclusion of the feeding cycle, the spindle 2 may be revolved in a clockwise direction whereby the film is rewound and coiled about the reel or other appropriate structure within the casing 1. Substantially at the conclusion of the re-winding operation the pin is automatically disengaged from the slot, travels through the gate, not shown, of the film handling apparatus and comes to rest in the recess against the sides of the opening 14 in the container 1, thus preventing the complete disappearance of the film within this container and making it readily accessible to the fingers of the operator when it is desired to re-thread it through the apparatus. I may provide a cover 15 adapted to be moved into position to protect the film during shipment or storage, and to extend over the pin 7 when adjacent the opening 14.

It will be readily understood by those skilled in the art that my provision of a shield for the sprocket which moves the film to project the same, as disclosed and claimed in my co-pending application Serial Number 54,910, and of means whereby this shield is in protective position during film threading and film rewinding is particularly important since it protects the teeth of the sprocket from injury from the pin and since it protects the film from injury from the teeth of the sprocket. Also my provision of a yielding drive for the supply spindle disclosed in said application, Serial Number 54,910, and in my copending application Serial Number 348,633, filed March 20, 1929, as a continuation in part of said last previously recited application, is likewise important because it prevents undue strain upon the film as the pin comes to rest at the conclusion of the rewinding operation.

In order to seat the pin more securely in the hub 6 and to prevent the irregular or uneven coiling of the film about the hub, as is clearly shown in Figure 2 of the drawings, I may provide a radial slot 8' with a terminal recess 16 lying within the area of the hub 6'. As the reel is revolved in an anti-clockwise direction, the pin will be drawn to the bottom of this recess, and the film will coil about the hub without any appreciable hump or protuberance caused by the pin. This recess 16 may readily be formed as the hub 6' is stamped from sheet metal.

Under certain conditions, I prefer to form each side 5 or 17 of the reel from sheet metal with square spindle openings 19 or 19'. To compensate for dimensional and other differences in the spindles upon which these reels may be used, I may provide within the hub 6 or 6' a compensating element 21 or 21' whereby the reel may be adapted to co-act with spindles of varying dimensions and contours, according to the invention disclosed and claimed in the co-pending application of Warren Dunham Foster and Clarkson Ulysses Bundick, Serial Number 170,181, filed February 23, 1927. In such case the inner portion of the recess 16 is adapted to guide the compensating element 21' and prevent its rotation relatively to the axis of the spindle although permitting such free lateral movement as is necessary to its proper operation in the positioning of the reel upon the spindle.

As is clearly shown in Figure 5 I may provide a laterally off-set extension 22 to the radial slot 23 in the plates 24. It is of course understood that a second side plate is supported by the hub in spaced parallelism thereto. Such an extension may be placed within the hub of the reel as is clearly shown in Figure 5 of the drawings, or it may be placed slightly outwardly of the hub. As the reel revolves in an anti-clockwise direction during the driving or feeding cycle, the pin will be drawn by the traction of the film into this recess, and as the reel continues to revolve, the film will be firmly seated therein. As a consequence, accidental displacing during the feeding cycle will be extremely unlikely, although substantially at the conclusion of the re-winding cycle the pin will automatically be withdrawn from the extension and from the slot itself.

Figures 6 and 7 of the drawings show other modifications of my invention. In the former figure the slot 26 in the side plates 27 of the reel extends substantially tangential to the hub 28. A second side plate (not shown), is supported by the hub in spaced parallelism to the side plate 27. It will be readily understood that this construction insures the seating of the film during the feeding cycle although permitting easy and automatic withdrawal substantially at the conclusion of the re-winding cycle. In Figure 7 of the drawings I show the slot 29 in the reel side 30 as curved and extending from the hub 31 to the periphery of the reel side. The traction of the film as the reel is revolved in the feeding direction will draw the pin to the end of the slot and prevent its accidental withdrawal therefrom, and the traction of the film as the reel is revolved thereby in a re-winding direction will readily withdraw the pin therefrom substantially at the conclusion of the rewinding cycle.

It will be readily understood that a compact and simple container such as I describe, together with means for readily attaching one end of the film carried thereby to a feeding mechanism and its ready and automatic detachment therefrom, is particularly applicable to that type of film feeding apparatus which produces both pictures and sound, or in a so-called film playing phonograph which produces sound alone. In both such cases the complete protection of the film and its storage in small bulk are important factors. It will be readily understood, also, that my invention is applicable to a camera for the taking of so-called motion pictures or a succession of still pictures. In order to prevent so-called edge-fog, it has been proposed to supply motion picture negative in a single light-tight container from which it is fed during exposure and into which it is rewound after exposure. It will be readily understood that my invention provides a container and means of attachment particularly well adapted for such use. By any of several well-known means a light-trap may be provided adjacent the orifice 14 of the container. As an additional precaution in case a paper leader is used, as is now common in the art in spite of the many difficulties which it presents, or in case no leader is used and the length of the film between the pin and the opening 14 is deliberately fogged during the threading process, the cover 15 may be made light tight.

Certain advantages of my invention have been stated in the above portion of this specification. Other advantages include the provision of a small, compact inexpensive film container and means cooperating therewith whereby the film within said container may be readily threaded into full operative relation with a film handling instrument and be automatically rewound from such relation and coiled within the container at the conclusion of the rewinding operation.

I claim:

1. Film handling apparatus, including a rotatable carrier to which one end of a film is secured, a protective housing enclosing said carrier, an opening in the periphery of said housing through which said film may extend from said carrier, and a cover attached to said housing and movable, upon an axis parallel to the axis of said rotatable carrier, between a first position wherein said cover encloses said opening to protect the film within said carrier to a second position wherein said cover is disposed free of said opening whereby the passage of said film from or to the interior of said carrier is unimpeded.

2. Film handling mechanism including a carrier to which one end of a first film is secured, an opening in the periphery of said carrier through which said film may extend, a pin attached to the outer end of said film, said pin being larger than said opening in said carrier whereby when said film is rewound within said carrier said outer end of said film is rendered accessible and being constructed to cooperate with an opening in a second carrier for detachably connecting the film thereto, a second carrier formed with such an opening, and a cover attached to said first carrier and movable relatively thereto adapted to cover said opening and said pin to protect said film when said film is positioned within said first carrier.

3. For use in a film handling mechanism, a detachable carrier to which one end of a film is secured, a second carrier comprising a hub having a depression therein and two side plates supported thereby, means for detachably connecting the opposite end of said film to said second carrier, said means including a double headed pin attached to said last mentioned end of said film and movable relatively to said second carrier, and slots in said side plates of said second carrier adapted for the reception of said pin, each of said slots extending radially from said depression in said hub to the circumference of said plates.

4. For use in a film handling mechanism, a detachable carrier to which one end of the film is secured, a second carrier comprising a hub and side plates supported thereby, means for detachably connecting the opposite end of said film to said carrier, said means including a pin attached to said last mentioned end of said film, and said side plates of said carrier including an offset slot for the reception of said pin.

5. For use in a film handling mechanism, a detachable carrier to which one end of the film is secured, a second carrier comprising a hub and side plates supported thereby, means for detachably connecting the opposite end of said film to said carrier, said means including a pin attached to said last mentioned end of said film, and said side plates of said carrier including a slot for the reception of said pin, one side of said slot at the inner end thereof having a lateral extension.

6. For use in a film handling mechanism, a detachable carrier to which one end of the film is secured, a second carrier comprising a hub and side plates supported thereby, means for detachably connecting the opposite end of the film to said carrier, said means including a pin attached to said last mentioned end of the film, and said side plates of said carrier including a substantially radial slot for the reception of said pin, one side of said slot at the inner end thereof being characterized by a lateral extension whereby when said second carrier is rotated in one direction said pin is held thereby and when said carrier is rotated in the other direction said pin is freed therefrom and adapted to be removed from said slot.

7. As an article of manufacture, a film carrier comprising side plates, a substantially cylindrical hub with a depression formed therein throughout the width thereof, substantially parallel to the axis thereof, the inner portion of said depression having an extension lateral thereto, and opposite slots in each of said side plates, each of said slots extending from said depression to the circumference of said side plates.

8. For use in a film handling apparatus, a detachable carrier to which one end of a film is secured, a second carrier, a slot therein extending to the circumference thereof, and means for detachably connecting the opposite end of the film to said second carrier, said means including a pin secured to said last mentioned end of the film and constructed with guiding formations thereupon, said formations being arranged to cooperate with said second carrier for maintaining said pin against substantial movement lateral to said slot while permitting its free longitudinal movement therewithin.

9. For use in a film handling mechanism, a detachable carrier to which one end of the film is secured, a second carrier comprising a cylindrical hub and two side plates supported thereby, and means for detachably connecting the opposite end of the film to said second carrier, said means including a pin attached to said last mentioned end of the film and said side plates of said secured carrier including slots for the reception of said pin, said slots extending from said hub to the circumference of said plates and said pin being constructed with a head upon each end thereof for cooperation with each of said side plates for preventing substantial lateral movement between said pin and said side plates.

10. In combination, a film carrier and a pin for attaching a film thereto, said carrier comprising a hub, side plates supported thereby in spaced parallelism to each other, and opposite slots in each of said side plates, and said pin including a substantially cylindrical body, said body being constructed with an annular groove upon each end thereof, such grooves being disposed in planes normal to the axis of the pin, the shoulder formed by each side of each of such grooves being arranged to cooperate with each of the sides of each of said plates to maintain the pin against movement out of such slots in a direction lateral thereto and such grooves being constructed and arranged to permit the free movement of said pin in a direction radial to the axis of said hub.

11. For use in a film handling mechanism, a detachable carrier to which one end of the film is secured, a second carrier comprising a cylindrical hub and two side plates supported thereby, and means for detachably connecting the opposite end of the film to said carrier, said means including a pin attached to said last mentioned end of the film and said side plates of said carrier including slots for the reception of said pin, said pin being constructed to be longitudinally movable within said slots and embodying primary guides lateral to said pin adjacent each end thereof, adapted to cooperate with the outside of each of said side plates, and secondary guides lateral to said pin and adjacent said primary guides and disposed inwardly thereof adapted to cooperate with the inside of each of said plates whereby the tilting of said pin during the longitudinal movement thereof within said slot is prevented.

12. Film handling mechanism including two revoluble spindles, a carrier to which one end of a film is secured, said carrier being adapted for mounting upon one of said spindles, a second carrier comprising a hub and side plates supported thereby in spaced parallelism to each other, said second carrier being mounted upon the other of said spindles, means for detachably connecting the opposite end of the film to said second carrier, said means including a pin attached to said last mentioned end of the film and movable relatively to said carrier, and opposite slots in said side plates of said second carrier adapted for the reception of said pin, each of said slots extending from said hub to the circumference of said plate and constructed and arranged so that as said carrier is rotated in one direction by the rotation of the spindle upon which it is mounted said pin is drawn to the inner extremity of said slot and when said carrier is rotated in the opposite direction by the traction of the film as it is wound upon said first carrier by the rotation of the spindle upon which said first carrier is mounted said pin is removed from the outer extremity of said slot, said pin including guiding extensions adjacent each end thereof constructed for preventing substantial lateral movement between said pin and plates.

13. As an article of manufacture, a film carrier comprising a hub having an inwardly extending depression formed therein throughout the width thereof substantially parallel to the axis thereof, side plates attached thereto and supported thereby, slots in each of said side plates, each of said slots extending to said hub and terminating in said depression, and a disk placed within said hub and constructed to be freely movable longitudinally thereof and be guided against rotational movement within said hub by said depression.

14. As an article of manufacture, a film carrier comprising a hub having an inwardly extending depression formed therein throughout the width thereof substantially parallel to the axis thereof, said plates attached thereto and supported thereby, slots in each of said side plates, each of said slots extending to said hub and terminating in said depression, and a disk placed within said hub and constructed to be freely movable longitudinally thereof and to be guided against rotational movement within said hub by said depression, said disk and said side plates having coaxial openings for the reception of a supporting spindle.

15. A film handling apparatus, including a spindle extending therefrom, and a cylindrical film carrier for use therewith, said carrier comprising a hub, side plates attached to said hub and supported thereby in spaced parallelism to each other, said hub and said side plates being formed with co-axial openings for the reception of said spindle whereby said carrier may be removably mounted upon said apparatus and slots in said side plates extending from said hub to the circumference of said plates.

16. A film handling apparatus, including a spindle extending therefrom, and a film carrier for use therewith, said carrier comprising a hub having a depression formed therein throughout the width thereof substantially parallel to the axis thereof, side plates supported by said hub, said side plates and said hub being formed with co-axial openings for the reception of said spindle whereby said carrier may be removably mounted upon said apparatus, and slots in each of said side plates, each of said slots extending from the circumference of said plates to said hub and terminating in said depression.

17. A film handling apparatus, including a spindle extending therefrom, and a cylindrical film carrier for use therewith, said carrier comprising a hub, side plates attached thereto and supported thereby in spaced parallelism to each other, said side plates and said hub being formed with co-axial openings for the reception of said spindle whereby said carrier may be removably mounted upon said apparatus, and opposite radial slots in each of said side plates extending from and including a depression, substantially coaxial with said hub and formed in the interior of said hub, to the circumference of said plates.

18. A film handling apparatus, including a spindle extending therefrom, and a cylindrical film carrier for use therewith, said carrier comprising a hub, side plates attached thereto and supported thereby in spaced parallelism to each other, said side plates and said hub being formed with co-axial openings for the reception of said spindle whereby said carrier may be removably mounted upon said apparatus, and opposite slots in each of said side plates extending from and including a depression, substantially parallel to the axis of said hub and formed in the interior of said hub, to the circumference of said plates.

Signed at New York city, in the county of New York and State of New York, this 28th day of December, A. D. 1928.

BARTON ALLEN PROCTOR.